(12) United States Patent
Gu et al.

(10) Patent No.: US 6,867,408 B1
(45) Date of Patent: Mar. 15, 2005

(54) ERASABLE/REWRITABLE OPTICAL DATA STORAGE WITH PHOTOREFRACTIVE POLYMERS

(75) Inventors: Min Gu, Victoria (AU); Daniel J Day, Victoria (AU); Andrew J. Smallridge, Victoria (AU)

(73) Assignee: Victoria University of Technology, Footscray (AU)

( * ) Notice: Subject to any disclaimer, the term of this patent is extended or adjusted under 35 U.S.C. 154(b) by 0 days.

(21) Appl. No.: 09/913,673

(22) PCT Filed: Feb. 16, 2000

(86) PCT No.: PCT/AU00/00117

§ 371 (c)(1),
(2), (4) Date: Oct. 25, 2001

(87) PCT Pub. No.: WO00/49465

PCT Pub. Date: Aug. 24, 2000

(30) Foreign Application Priority Data

Feb. 17, 1999 (AU) .............................................. PP 8738
Oct. 14, 1999 (AU) .......................................... PQ 3413

(51) Int. Cl.[7] .............................................. G11C 13/02
(52) U.S. Cl. .................... 250/201.5; 365/107; 365/121; 365/151
(58) Field of Search ..................... 250/201.5, 566–570; 365/106, 107, 121, 127, 151

(56) References Cited

U.S. PATENT DOCUMENTS 5,268,862 A   12/1993  Rentzepis ................... 365/153
5,289,407 A   2/1994   Strickler et al. ............. 365/106
5,325,324 A * 6/1994   Rentzepis et al. .......... 365/127
5,472,759 A   12/1995  Chen et al. ................. 428/65.1
5,724,460 A   3/1998   Hayden et al. ................. 385/4
5,739,929 A   4/1998   Macfarlane ..................... 359/3
5,744,267 A   4/1998   Meerholz et al. .............. 430/1
5,864,412 A * 1/1999   Wilde ............................ 359/7

FOREIGN PATENT DOCUMENTS

WO    WO 93/02454    2/1993

OTHER PUBLICATIONS

Optics Communications, North–Holland Publishing Co. Amsterdam, NL, vol. 128, No. 4, Jul. 15, 1996, pp. 205–210 entitled "Molecular transformation as a means for 3D optical memory devices".
Copy of Supplemental European Search Report.

* cited by examiner

Primary Examiner—Thanh X. Luu
Assistant Examiner—Stephen Yam
(74) Attorney, Agent, or Firm—Westman, Champlin & Kelly, P.A.

(57) ABSTRACT

A method of erasable/rewritable optical data storage is provided in which a laser beam from a laser (10) operated in either a pulsed or continuous wave mode is focussed by an optical system (11–18) onto a photorefractive polymeric material (32) to cause two photon excitation of the material to record data which may subsequently be erased by illuminating the material with radiation having a wavelength in the ultraviolet or visible spectrum to erase the recorded data. New photorefractive polymeric materials having a relatively narrow absorption band for use in the method are also disclosed.

49 Claims, 6 Drawing Sheets

ERASABLE/REWRITABLE OPTICAL DATA STORAGE WITH PHOTOREFRACTIVE POLYMERS

This application is a national stage filing under 35 U.S.C. § 371 and priority is hereby claimed on International Application No. PCT/AU00/00117, Filed 16 Feb. 2000, which International Application was published in English as No. WO 00/49465.

This invention relates to optical data storage and more particularly to erasable/rewritable three-dimensional optical data storage with photorefractive polymers.

Multi-layered (or three-dimensional) optical memories have increasingly become a field of interest in the development of high-density optical data storage devices. Systems that utilise multiple layer recording can achieve recording densities from 100 to 10,000 times higher than conventional optical data storage devices.

The use of two-photon excitation in three-dimensional (3D) bit optical data storage has grown due to its ability to increase the density in a given material by reducing the volume of the recorded bit. The probability of two-photon excitation is proportional to the squared intensity of the incident light; this effect produces excitation only within a small region of the focus spot. As a result there is less cross talk between neighbouring data layers. Another advantage of two-photon excitation is the reduction of multiple scattering because of the utilisation of an illumination beam of an infrared wavelength, so that more layers can be recorded along the depth of a volume material.

Over the years different materials have been used for 3D bit data storage under two-photon excitation. Two-photon 3D bits recorded in photopolymerizable and photobleaching materials have demonstrated-that recording densities could reach terabits per cubic centimeter; unfortunately both materials are not erasable. U.S. Pat. No. 5,289,407 assigned to Cornell Research Foundation, Inc. Discloses a method of 3D optical data storage in which a beam of coherent light is used to cause two-photon photopolymerization of a specimen gel to produce a bead of polymerised material in the gel which has a different refractive index from the surrounding gel material. However, this change is irreversible, and so the data bits are not erasable.

Photochromic materials that undergo a change in isomer states and photochromic polymers that produce a change in refractive-index upon two-photon excitation are both erasable materials. Another type of material that is of considerable interest is photorefractive material. The photorefractive effect results in a modulation of the refractive-index at the point of focus induced by the spatial distribution of electric charges upon illumination.

It has been discovered that such a change in the refractive index in photorefractive material may be reversed by illuminating the medium again with radiation to produce a uniform redistribution of the electric charges and erase the recorded information. However, this has previously only been achieved in a photorefractive crystals, e.g. lithium niobate (LiNbO$_3$), which are expensive to manufacture.

It is therefore desirable to provide a method of writing and erasing optical data in relatively inexpensive materials.

According to one aspect of the invention, there is provided a method of writing and erasing optical data comprising:

producing a beam of focusable, coherent light;
focussing the beam on a photorefractive polymeric material to cause two-photon excitation of the material at the focal point of the beam thereby modulating the refractive index at the focal point to record data; and
illuminating the material with radiation to erase the recorded data.

According to another aspect of the invention there is provided a method of writing and re-writing optical data in a photorefractive polymeric material comprising:

focussing a beam of coherent light on the photorefractive polymeric material to cause two-photon excitation of the material at the focal point of the beam thereby modulating the refractive index at the focal point to write data;
illuminating the material with radiation to erase the recorded data;
focussing another beam of coherent light on the photorefractive material to cause two-photon excitation of the material at the focal point of the beam thereby modulating the refractive index at the focal point to re-write data in the photorefractive material.

In the method of the present invention, the two-photon excitation produces a change in the spacial distribution of the electric charges at the focal point, thereby modulating the refractive index of the material at the focal point.

Preferably, the photorefractive polymeric material used in the method is such that illumination with electromagnetic radiation in the ultraviolet (UV) or visible spectrum produces a uniform redistribution of the spacial distribution of the electric charges forming the data bits to erase the recorded data. The photorefractive polymer is preferably arranged to absorb radiation in only a narrow band in the UV to visible region of the electromagnetic spectrum. Creating a narrow absorption band will decrease the materials susceptibility to deterioration from the reading process or from incidental ultraviolet light (e.g. from sunlight).

A laser may be used in a pulsed mode or a continuous wave laser may be used to write data by two-photon excitation of a photorefractive material. An ultrashort pulsed laser beam is typically used for two-photon exitation because the cooperative nature of two-photon excitation requires the use of a high peak power laser to produce efficient excitation. However, the use of an ultrashort pulse laser increases the cost of a recording device and makes it difficult to produce a compact system. We have also demonstrated that two-photon excitation under continuous wave (CW) illumination is possible. Although the average power needed for CW excitation is increased by approximately two orders of magnitude compared with ultrashort pulsed illumination, the use of continuous wave illumination can enable a fast, low cost, compact erasable two-photon 3D bit optical data storage system to be achieved.

The photorefractive material preferably includes a chromophore which provides absorption in the UV to visible region. The polymer may also be doped with a photosensitive material which provides absorption in the UV to visible region of the electromagnetic spectrum. In one embodiment, the polymer may comprise poly (N-vinylcarbazole) (PVK). In another preferred embodiment, the polymer may comprise poly (methyl methacrylate) (PMMA). Each of these polymers may be doped with a photosensitive material, such as 2, 4, 7-trinitro-9-fluorenone (TNF). One preferred chromophore is 2, 5-dimethyl-4-(p-nitrophenylazo) anisole (DMNPAA) which also provides absorption and an electrooptical effect in the UV to visible region. The polymeric material may also include a plasticiser, such as N-ethylcarbazole, (ECZ) to reduce the glass transition temperature of the material.

In the present invention, recorded bits of data may be read by employing a confocal microscope, a differential interference contrast (DIC) microscope and/or a phase microscope utilising a source of coherent light of a wavelength on the edge of or outside the absorption band of the photorefractive polymeric material.

According to a further aspect of the invention there is provided a photorefractive polymeric material for use in a method of erasable optical data storage, the photorefractive polymeric material providing absorption in the UV to visible region of the electromagnetic spectrum, wherein the absorption band of the photorefractive material is such as to enable the recording of bits of data by two photon excitation, the reading of the bits of data by a source of coherent light on the edge of or outside the absorption band, and the erasing of the bits of data by illumination with radiation within the absorption band. The polymeric material preferably comprises a polymer, such as PVK or PMMA. The material may include a chromophore which provides absorption in the UV to visible region of the electromagnetic spectrum. Optionally, the polymer may also be doped with a photosensitive material which provides absorption in the UV to visible region of the electromagnetic spectrum, and a plasticiser may be added to reduce the glass transition temperature of the material.

Preferably, a new photorefractive polymeric material in accordance with the second aspect of the invention includes at least some of the following materials in quantities falling substantially within the following ranges by percentage of the total weight of the photorefractive polymeric material:

25%–100% of a polymer, such as PVK or PMMA;
0%–60% of a chromophore, such as DMNPAA;
0%–5% of a photosensitive material, such as TNF; and
0%–40% of a plasticiser, such as ECZ.

Preferred embodiments of the present invention using cheap photorefractive polymers as recording materials for rewritable/erasable 3D bit optical data storage under two-photon excitation to produce a high-density 3D optical data storage system will now be described by way of example only, with reference to the accompanying drawings, in which:

FIG. 4(a) shows a first layer including letter "A";

FIG. 4(b) shows a second layer including letter "B" and

FIG. 4(c) shows a third layer including letter "C";

FIG. 6(a) shows a first layer including letter "A";

FIG. 6(b) shows a second layer including letter "B" and

FIG. 6(c) shows a third layer including letter "C".

One example of a new photorefractive polymetric material that has been used to demonstrate rewritable/erasable 3D bit optical data storage is the polymer poly (N-vinylcarbazole (PVK) doped with the photosensitive material 2, 4, 7-trinitro-9-fluorenone (TNF) which provides absorption in the UV to visible region of the spectrum. The photorefractive material also included, as a chromophore, 2, 5-dimethyl-4-(p-nitrophenylazo)anisole (DMNPAA) which also provides absorption in the UV to visible region. In this experiment compared with previous experiments the randomly oriented chromophores were not aligned by applying an electric field (poling) during polymerisation and operation. Poling of the material requires the creation of a magnetic field across the surfaces of the polymer. Such a uniform magnetic field is difficult to maintain across the surface of a larege polymer sample, increasing the complexity in fabricating the new photorefractive polymer. Finally N-ethylcarbazole (ECZ) was added to reduce the glass transition temperature of the material. One preferred concentration of the materials DMNPAA:PVK:ECZ:TNF is 50:33:16:1 by percentage weight of the toral weight of the photorefractive material although it will be appreciated that different proportions of the constituent materials may be used within the ranges specified above. Uniforms films of thickness 100 μm were fabricated by combining all the materials in a teflon cast then polymerising the PVK at a temperature of 90° C. over 2 days. The resulting polymer block was cut and polished to produce the sample used in the experiments.

Another example of a new photorefractive polymeric material that has been used to demonstrate rewritable/erasable 3D bit optical data storage is the polymer poly (methyl methacrylate) (PMMA) doped with the photosensitive material 2, 4, 7-trinitro-9-fluorenone (TNF) which provides absorption in the UV to visible region of the spectrum. The photorefractive material also included, as a chromophore, 2, 5-dimethyl-4-(p-nitrophenylazo)anisole (DMNPAA) which also provides absorption in the UV to visible region. In this experiment the randomly orientated chromophores were not aligned by applying an electric field (poling) during polymerisation and operation. Such a poling electric field is not necessary because the local electric field in the focus produced by a high numerical aperture objective is five orders of magnitude greater than that of the incident beam over the objective aperture. This local electric field is strong enough to induce a detectable electro-optic effect.

Finally N-ethylcarbazole (ECZ) was added to reduce the glass transition temperature of the material. One preferred concentration of the materials DMNPAA:PMMA:ECZ:TNF used: was 10:73:16:1 by percentage weight of the total weight of the photorefractive material although it will be appreciated that different proportions of the constituent materials may be used within the ranges specified above. Uniform films of thickness 100 μm were fabricated by combining all the materials in a teflon cast then polymerising the PMMA at a temperature of 65° C. over 2 days. The resulting polymer block was cut and polished to produce the sample used in the experiments.

Figure 1:
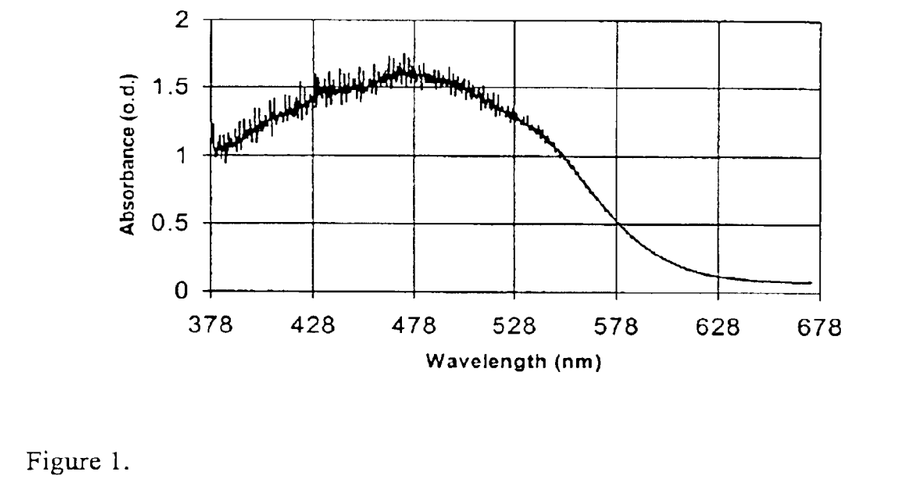
FIG. 1 is a graph showing the absorption curve of a photorefractive polymeric material for use in the present invention.

FIG. 1 illustrates the absorption band of a 100 μm thick sample of the new photorefractive polymeric materials based on PVK as detected in an Oriel UV-Vis spectrophotometer using a Xenon arc lamp source. The absorbtion band of the photorefractive polymeric material based on PMMA is almost identical.

It is seen from FIG. 1 that the maximum of the absorption band of the new materials is within 380–600 nm. Therefore a laser beam of an infrared wavelength at 800 nm can be used in the recording process to produce two-photon excitation at 400 nm. The wavelength for recording may fall substantially within the range from about 750 nm to about 1200 nm. Since the absorption band cuts off approximately at a wavelength of 630 nm, a range of wavelengths from about 630 nm to about 1200 nm can be chosen to read out the recorded photorefractive data bits without suffering from single-or two-photon excitation. Wavelengths above about 750 nm can be used provided the power of the reading beam is sufficiently low as not to cause single or two-photon excitation.

Figure 2:
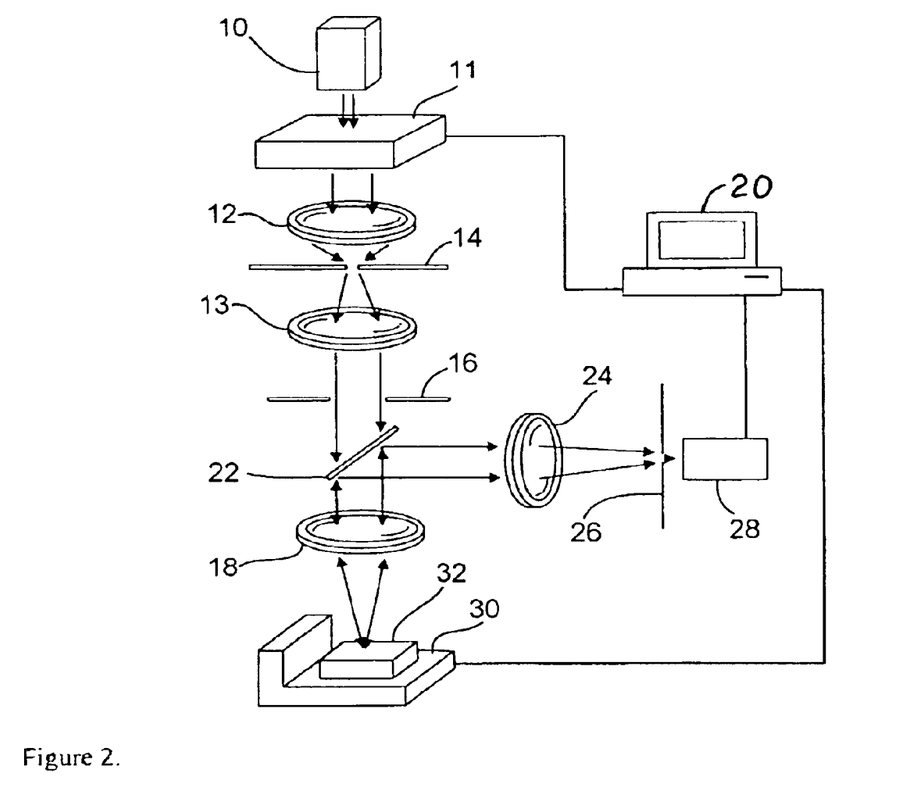
FIG. 2 is a schematic diagram of a two-photon excitation microscope used to record data bits in a photorefractive polymer.

Referring to FIG. 2, there is illustrated an optical system for two photon recording of bits of data in the photorefractive polymeric materials. The recording system comprises a laser (10), a mechanical shutter (11), linked to a computer (20), lenses (12, 13), a pin hole aperture (14), another aperture (16), and an objective lens (18). For reading with confocal geometry, the system also includes a beam splitter (22), a further lens (24), another pin hole aperture (26) and a detector (28) also linked to the computer (20). A three-dimensional scanning stage (30) is provided for the mounting of the sample of photorefractive material (32). The scanning stage (30) is movable in the x, y and z directions under the control of the computer (20).

In the recording process, a Spectra-Physics Tsunami Ti:sapphire laser (10), was focused into the photorefractive polymer sample (32). The laser was used in a pulsed mode to record the bit patterns of FIGS. 3 and 4 in the PVK photorefractive polymeric material. In mode-locking operation, the laser can produce an ultrashort pulsed beam with a pulse width of 80 fs and an average power of 800 mW. The laser was operated in a continuous wave (CW) mode to record the bit patterns of FIGS. 5 and 6 in the PMMA photorefractive polymeric material. In each case, the wavelength of the laser was tuned to 800 nm, which approximately corresponds to twice the wavelength of the main absorption band of the sample. From the absorption curve in FIG. 1, we can see that there will be no single-photon absorption at a wavelength of 800 nm; only the two-photon absorption can occur at a wavelength of 400 nm. The logic state of the recorded information was controlled by the mechanical shutter (11) linked to the computer (20). The recording material (32) was mounted upon a Melles Griot computer-controlled 3D translation stage (30). For recording, a Zeiss Fluar objective (FIGS. 3 and 4) and an Olympus UPlanAPO objective (FIGS. 5 and 6) (18) with numerical apertures of 0.75 and 0.70 respectively and magnification factors of 20 were used.

Figure 3:
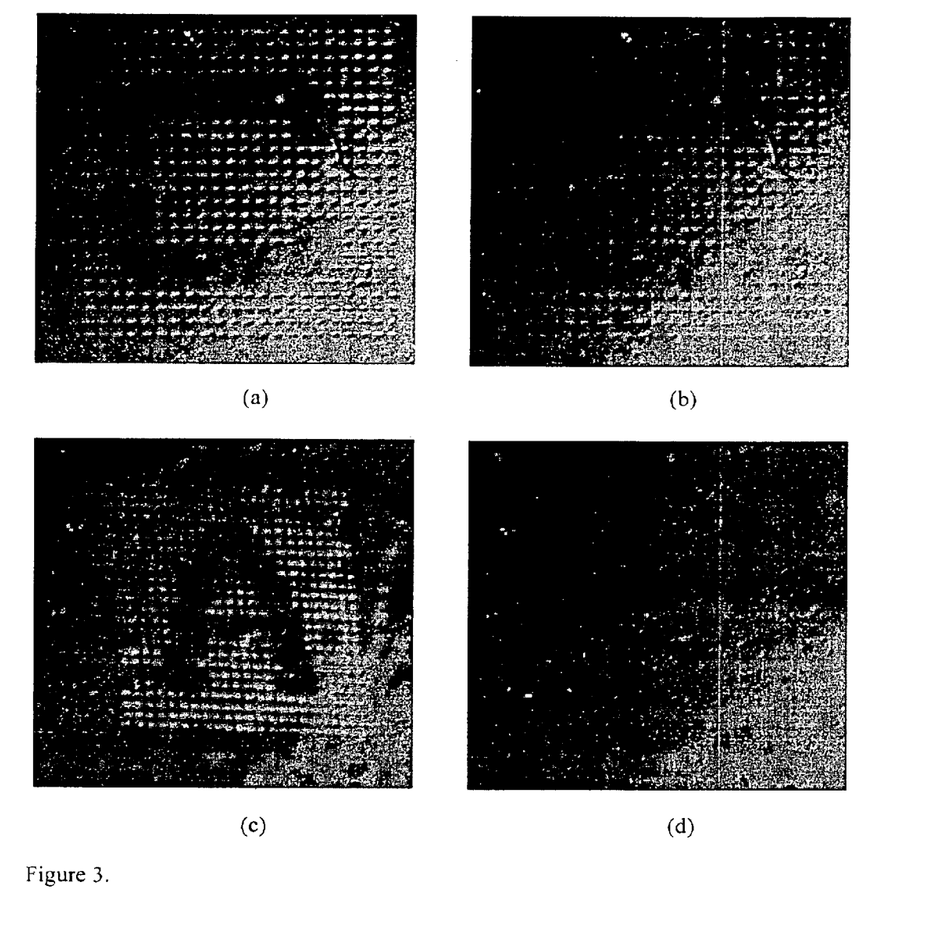
FIG. 3(a) is a 24×24 bit pattern of the letter "C" recorded by two-photon excitation in a photorefractive polymer PVK upon its first reading.
FIG. 3(b) is the same region after reading 500 times.
FIG. 3(c) is a 24×24 bit pattern of the letter "A"
FIG. 3(d) is the same region as FIG. 3(c) after being exposed to UV illumination showing complete erasure of the recorded information.
Figure 4:
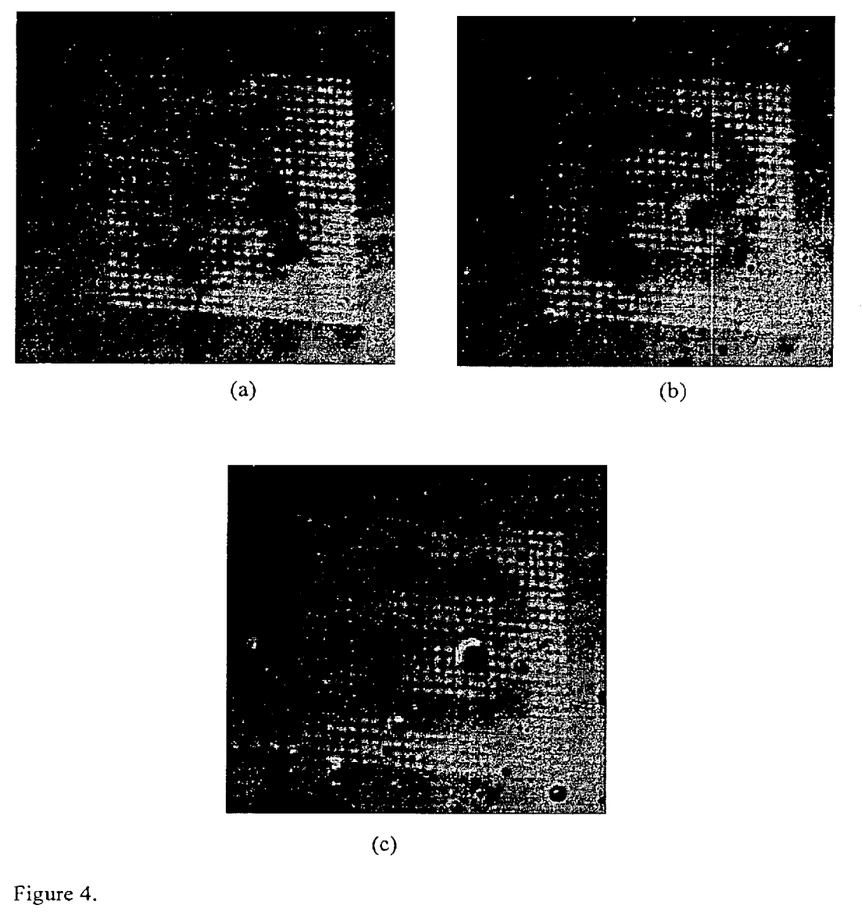
FIG. 4 shows recorded 24×24 bit patterns at different depths in the photorefractive polymer PVK using two-photon excitation.
Figure 5:
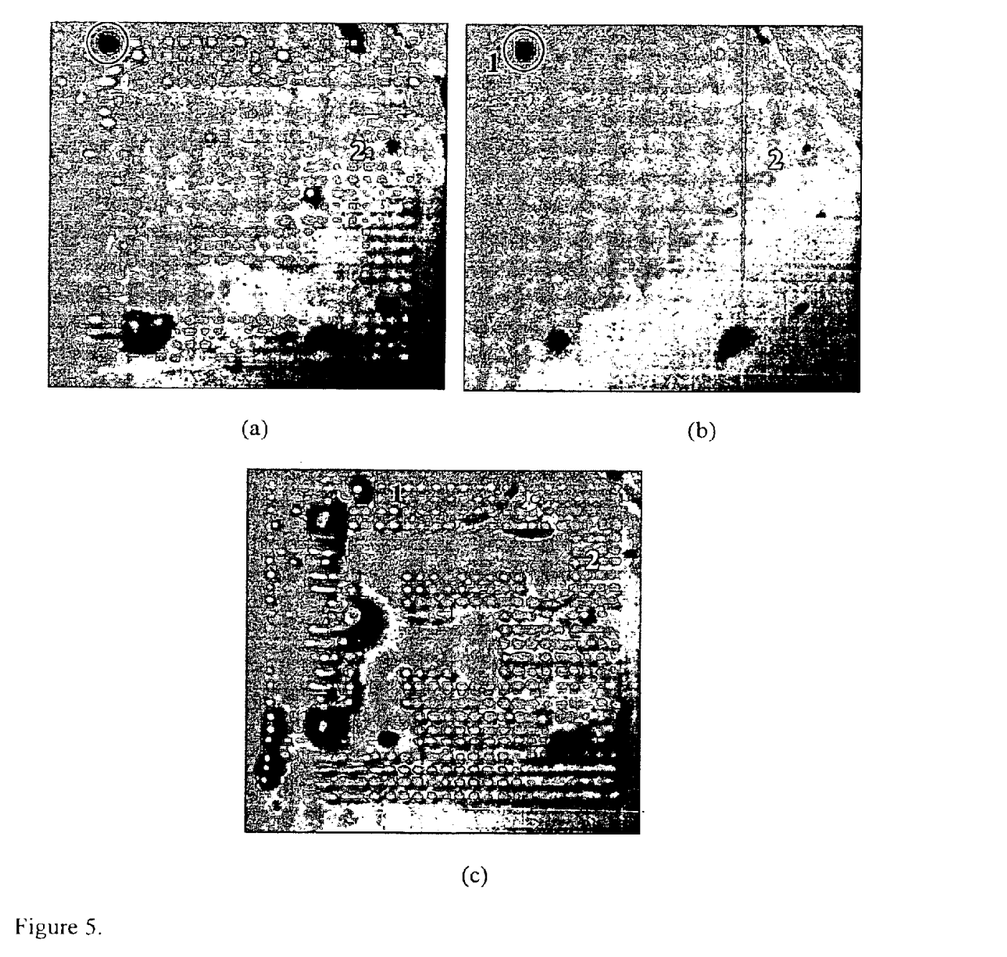
FIG. 5(a) is a bit pattern of the letter "E" recorded by two-photon excitation in another photorefractive polymer (PMMA).
FIG. 5(b) is the same region as FIG. 5(a) after being exposed to UV illumination showing erasure of the recorded information.
FIG. 5(c) is a bit pattern of the letter "F" written into the same area as FIGS. 1 and 2.

For reading the change in refractive-index caused by the two-photon photorefractive effect an Olympus Fluo View microscopes was employed and used in a differential interference contrast (DIC) mode. A He-Ne laser of wavelength 632.8 nm was coupled into the Fluo View for reading the recorded information, as the wavelength of 632.8 nm is on the edge of the absorption band and causes minimal damage to the recorded information (see FIG. 1). To erase the recorded information the region of interest was illuminated with the UV line of a mercury lamp in the Fluo View microscope. In both the reading and erasing an Olympus UPlanAPO objective (18) either with a numerical aperture of 0.7 and a magnification factor of 20 (FIGS. 3 and 4) or with a numerical aperture of 0.4 and a magnification factor of 10 (FIGS. 5 and 6) was used As a demonstaration of the ability to record information as a change in refractive-index using two-photon excitation, FIGS. 3(a) and 3(b) show the measured change in refractive-index produced at the focus spots. In recording an average power of 5 mW at the focus spot was used to record the information. A pattern. (the letter C) consisting of 24×24 bits was recorded in the sample. The bit separation was 3.2 $\mu$m, and the exposure time for each bit was 25 ms. In the reading process a laser beam of power less than 5 mW was scanned across the sample to produce the DIC image. FIG. 3(b) shows the deterioration of the recorded information after having been scanned 500 times. The contrast of the recorded bit in FIG. 3(b) is 90% of that in FIG. 3(a). This feature illustrates that there is a slight erasing of the information due to absorption of the light used for reading. The information recorded in FIG. 3(c) used the same power and exposure time as used in FIG. 3(a) and FIG. 3(b). FIG. 3(d) shows the same region as seen in FIG. 3(c) after being exposed to the UV illumination for 1–2 seconds. The result shows the complete erasure of the previously recorded information. FIG. 4 demonstrates the ability of this system to record and read changes in refractive-index of multiple layers of information. Three layers of information were recorded with a layer separation of 10 $\mu$m. Each layer consists of a pattern of 24×24 bits. The first layer, recorded near the surface contains a pattern of the letter "A". The second and third layers consist of the letters "B" and "C" respectively, thus the achieved 3D data density was approximately 10 Gbits/cm$^3$, which is comparable to that previously achieved in photochromic polymers, a photorefractive crystal and photobleaching materials.

FIG. 5(a) shows the ability to record information as a change in refractive-index using continuous wave two-photon excitation. In recording an average power of 75 mW at the focus spot was used to record the information. A pattern (the letter E) consisting of 24×24 bits was recorded in the sample. The bit separation was 5.6 $\mu$m, and the exposure time for each bit was 2 ms. In the reading process a laser beam of power less than 5 mW was scanned across the sample to produce the DIC image. FIG. 5(b) shows the same region as seen in FIG. 5(a) after being exposed to the UV illumination for 1–2 seconds. The result shows the complete erasure of the previously recorded information. In FIG. 5(c), a new pattern, the letter "F" is written into the same area as used in FIGS. 5(a) and 5(b). Two artifacts are marked with circles 1 and 2 in. FIGS. 5(a), (b) and (c) showing that the same area was used to erase and rewrite information.

Figure 6:
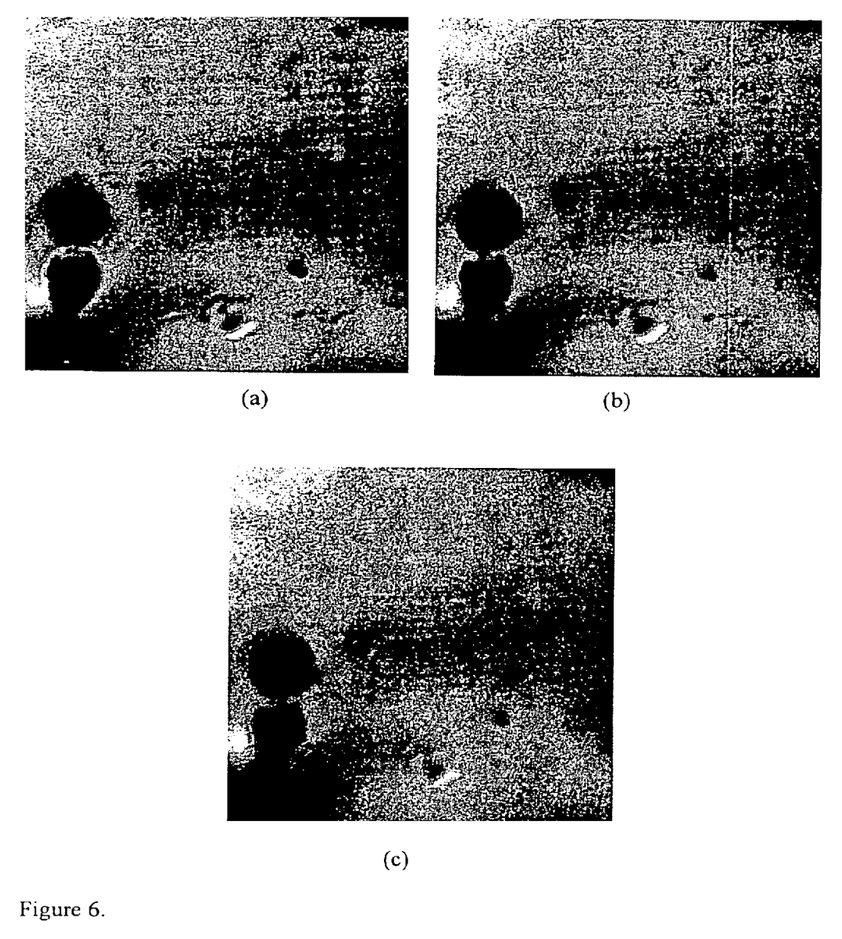
FIG. 6 shows recorded bit patterns at different depths in the photorefractive polymer PMMA using two-photon excitation.

FIG. 6 demonstrates the ability of this system to record and read changes in refractive-index of multiple layers of information. Three layers of information were recorded with a layer separation of 25 $\mu$m. Each layer consists of a pattern of 24×24 bits. The first layer, recorded near the surface contains a pattern of the letter "A". The second and third layers consist of the letters "B" and "C", respectively.

It will be seen from the above that the present invention provides an effective method of recording, reading, erasing and rewriting three dimensional data in relatively inexpensive photorefractive polymeric materials using either pulsed or continuous wave (CW) two-photon excitation to record and re-write the data, and illuminating with radiation in the UV or visible region of the electromagnetic radiation to erase the recorded data.

It will also be appreciated that various modifications, alterations and improvements may be made to the preferred embodiment described above without departing from the scope and spirit of the present invention. Such modifications or improvements that are envisaged to increase the storage capacity of the system include the following:

1. The compensation of small amounts of cross talk between the layers (see FIG. 4) due to spherical aberration from the refractive-index mismatch between the recording material (n=1.75) and the immersion medium (n=1). The refractive-index mismatch results in an increase in the diffraction spot size at a deep position of a volume recording medium. As a result, a series of axial side peaks occur along the depth of the recording medium, thus resulting in cross talk between neighbouring data layers. It may be possible to overcome this problem thereby increasing the density of data by using a variable tube length method.

2. Instead of the Ti:sapphire laser operated in CW mode, other types of continuous wave (CW) laser beams may be used to produce the two-photon excitation. For example, with the help of a 1.2 W CW laser diode, operated at a near-infiared wavelength, a fast, low cost, compact, erasable two-photon 3D bit optical data storage system can be achieved 3. Different photorefractive polymers may be used and the chemical properties of the materials may be modified to lead to an increase in the stability of the photorefractive polymer. By tailoring the absorption spectrum we can determine the wavelength of light that will affect the material. Creating a narrow absorption band in the Uw or visible region will decrease the materials susceptibility to deterioration due to irradiation from the reading process or from incidental UV light (i.e. sunlight).

4. A method for increasing the density of the two-photon data storage system by utilising a recording method may be based on the polarisation state of the recording beam. This technique allows multiple bits to be recorded at the same position within the material using different polarisation states of the recording beam, where upon reading, only the bits with an appropriate polarisation state are detected.

5. A method for selective bit erasure in the two-photon data storage system may be based on polarisation of the recording and reading beams. An individual bit can be selected and erased by changing the polarisation state of the recorded bit, so that it has an appropriate polarisation state which can either be detected or not detected upon reading.

What is claimed is:

1. A method of writing and erasing optical data comprising:
   providing a photorefractive polymeric material having a single isomeric state with a refractive index;
   focusing light on the photorefractive polymeric material to cause two-photon excitation of the material at the focal point to produce a refractive index inhomogeneity resulting from a non-uniform space-charge distribution within the region of excitation within the photorefractive polymeric material, thereby modulating the refractive index of the material at the focal point to record data; and
   illuminating the material with radiation to erase the recorded data.

2. A method of writing and re-writing optical data in a photorefractive polymeric material having a single isomeric state and a refractive index comprising:
   focusing light on the photorefractive polymeric material to cause two-photon excitation of the material at the focal point of the beam to produce a refractive index inhomogeneity resulting from a non-uniform space-charge distribution within the region of excitation within the photorefractive polymeric material, thereby modulating the refractive index at the focal point to write data;
   illuminating the material with radiation to erase the recorded data;
   focusing light on the photorefractive polymeric material to cause two-photon excitation of the material at the focal point to produce a refractive index inhomogeneity resulting from a non-uniform space-charge distribution within the region of excitation within the photorefractive polymeric material, thereby modulating the refractive index at the focal point to re-write data in the photorefractive polymeric material.

3. A method according to claim 1 wherein the photorefractive material is illuminated with electro-magnetic radiation having a wavelength in the ultraviolet (UV) or visible spectrum to produce a redistribution of the spatial distribution of the electric charges forming bits of the data to erase the recorded data.

4. A method according to claim 3 wherein the photorefractive polymeric material is such that it absorbs radiation in only a narrow band in the UV to visible region of the electromagnetic spectrum.

5. A method according to claim 3 wherein the maximum of the absorption band of the photorefractive polymeric material falls substantially within the range from about 380 nm to about 600 nm.

6. A method according to claim 3 wherein the photorefractive polymeric material is such that is absorbs substantially no radiation above a wavelength of about 630 nm.

7. A method according to claim 1 wherein the data recorded in the photorefractive polymeric material is read by illuminating the photorefractive polymeric material with coherent light of a wavelength falling substantially within the range from about 630 nm to about 1200 nm.

8. A method according to claim 1 wherein the light used to record data in the photorefractive material has a wavelength falling substantially within the range from about 750 nm to about 1200 nm to cause two-photon excitation.

9. A method according to claim 1 wherein a pulsed laser beam is used to record data in the photorefractive polymeric material.

10. A method according to claim 1 wherein a continuous wave laser beam is used to record data in the photorefractive polymeric material.

11. A method according to claim 1 wherein polarized coherent light is used to record polarized bits of data in the photorefractive polymeric material.

12. A method according to claim 11 wherein different polarization states of the recording beam are used to record multiple bits of data at the same position having different polarization states in the photorefractive polymeric material.

13. A method according to claim 11 wherein bits of recorded data are read by using a reading beam having an appropriate polarization state.

14. A method according to claim 11 wherein individual bits of data are erasable by changing the polarization state of the individual bits.

15. A method according to claim 1 wherein the photorefractive polymeric material includes at least about 25% of a polymer by percentage weight of the total weight of the photorefractive material.

16. A method according to claim 1 wherein the photorefractive polymeric material includes a chromophore which provides absorption in the UV to visible region of the electromagnetic spectrum.

17. A method according to claim 1 wherein the photorefractive polymeric material includes a photosensitive material which provides absorption in the UV to visible region of the electromagnetic spectrum.

18. A method according to claim 1 wherein the photorefractive polymeric material includes a plasticizer to reduce the glass transition temperature of the material.

19. A method according to claim 1 wherein the photorefractive material includes at least some of the following materials in quantities falling substantially within the following ranges by percentage of the total weight of the photorefractive material:
- 25%–99.5% of a polymer;
- 0.5%–60% of a chromophore;
- 0.5%–5% of a photosensitive material; and
- 0%–40% of a plasticizer.

20. A method according to claim 15 wherein the polymer comprises poly (N-vinylcarbazole) (PVK).

21. A method according to claim 15 wherein the polymer comprises poly (methyl methacrylate) (PMMA).

22. A method according to claim 16 wherein the chromophore comprises 2,5-dimethyl-4-(p-nitro-phenylazo) anisole (DMNPAA).

23. A method according to claim 17 wherein the photosensitive material comprises 2,4,7-trinitro-9-fluorenone (TNF).

24. A method according to claim 18 wherein the plasticizer comprises N-ethylcarbazole (ECZ).

25. A method according to claim 19 wherein the polymer comprises poly (N-vinylcarbazole) (PVK).

26. A method according to claim 19 wherein the polymer comprises poly (methyl methacrylate) (PMMA).

27. A method according to claim 19 wherein the chromophore comprises 2,5-dimethyl-4-(p-nitro-phenylazo) anisole (DMNPAA).

28. A method according to claim 19 wherein the photosensitive material comprises 2,4,7-trinitro-9-fluorenone (TNF).

29. A method according to claim 19 wherein the plasticizer comprises N-ethylcarbazole (ECZ).

30. A method according to claim 1 wherein the photorefractive polymeric material used in the method includes the following materials:
- poly(N-vinylcarbazole) (PVK);
- 2,5, dimethyl-4-(p-nitrophenylazo) anisole (DMNPAA)
- 2,4,7-trinitro-9-fluorenone (TNF); and
- N-ethylcarbazole (ECZ).

31. A method according to claim 30 wherein the PVK;DMNPAA;TNF and ECZ are present in approximately the following concentrations by percentage weight of the total weight of the photorefractive material 33:50:1:16.

32. A method according to claim 1 wherein the photorefractive polymeric material used in the method includes the following materials:
- poly (methyl methacrylate) (PMMA);
- 2,5, dimethyl-4-(p-nitrophenylazo) anisole (DMNPAA);
- 2,4,7-trinitro-9-fluorenone (TNF); and
- N-ethylcarbazole (ECZ).

33. A photorefractive polymeric material according to claim 32 wherein the PMMA: DMNPAA; TNF and ECZ are present in approximately the following concentrations by percentage weight of the total weight of the photorefractive polymeric material 73:10:1:16.

34. A method according to claim 2 wherein the photorefractive material is illuminated with electro-magnetic radiation having a wavelength in the ultraviolet (UV) or visible spectrum to produce a redistribution of the special distribution of the electric charges forming bits of the data to erase the recorded data.

35. A method according to claim 34 wherein the photorefractive polymeric material is such that it absorbs radiation in only a narrow band in the UV to visible region of the electromagnetic spectrum.

36. A method according to claim 34 wherein the maximum of the absorption band of the photorefractive polymeric material falls substantially within the range from about 380 nm to about 600 nm.

37. A method according to claim 34 wherein the photorefractive polymeric material is such that is absorbs substantially no radiation above a wavelength of about 630 nm.

38. A method according to claim 2 wherein the data recorded in the photorefractive polymeric material is read by illuminating the photorefractive polymeric material with coherent light of a wavelength falling substantially within the range from about 630 nm to about 1200 nm.

39. A method according to claim 2 wherein the light used to record data in the photorefractive material has a wavelength falling substantially within the range from about 750 nm to about 1200 nm to cause two-photon excitation.

40. A method according to claim 2 wherein a pulsed laser beam is used to record data in the photorefractive polymeric material.

41. A method according to claim 2 wherein a continuous wave laser beam is used to record data in the photorefractive polymeric material.

42. A method according to claim 2 wherein polarized coherent light is used to record polarized bits of data in the photorefractive polymeric material.

43. A method according to claim 42 wherein different polarization states of the recording beam are used to record multiple bits of data at the same position having different polarization states in the photorefractive polymeric material.

44. A method according to claim 43 wherein bits of recorded data are read by using a reading beam having an appropriate polarization state.

45. A method according to claim 44 wherein individual bits of data are erasable by changing the polarization state of the individual bits.

46. A method of optical data storage comprising:
providing a photorefractive polymeric material having a single isomeric state with a refractive index, the photorefractive polymeric material including the following materials:
- poly(N-vinylcarbazole) (PVK);
- 2,5, dimethyl-4-(p-nitrophenylazo) anisole (DMNPAA);
- 2,4,7-trinitro-9-fluorenone (TNF); and
- N-ethylcarbazole (ECZ); and
focusing light on the photorefractive polymeric material to cause two-photon excitation of the material at the focal point to produce a refractive index inhomogeneity resulting from a non-uniform space charge distribution within the region of excitation within the photorefractive material, thereby modulating the refractive index of the material at the focal point to record data.

47. A method of optical data storage according to claim 46 further including the steps of illuminating the material with radiation to erase the recorded data, and of re-writing data by focusing light on the photorefractive polymeric material after the original recorded data has been erased to cause two-photon excitation of the material at the focal point to produce a refractive index inhomogeneity resulting from a non-uniform space-charge distribution within the region of excitation within the photorefractive polymeric material thereby modulating the refractive index at the focal point to re-write the data.

48. A method of optical data storage comprising:
providing a photorefractive polymeric material having a single isomeric state with a refractive index, the photorefractive polymeric material including the following materials:

poly (methyl methacrylate) (PMMA);
2,5, dimethyl-4-(p-nitrophenylazo) anisole (DMNPAA);
2,4,7-trinitro-9-fluorenone (TNF); and
N-ethylcarbazole (ECZ); and
focusing light on the photorefractive polymeric material to cause two photon excitation of the material at the focal point to produce a refractive index inhomogeneity resulting from a non-uniform space-charge distribution within the region of excitation within the photorefractive polymeric material, thereby modulating the refractive index of the material at the focal point to record data.

49. A method of optical data storage comprising:
providing a photorefractive material having a single isomeric state with a refractive index; and
focusing light on the photorefractive polymeric material to cause two-photon excitation of the material at the focal point to produce a refractive index inhomogeneity resulting from a non-uniform space-charge distribution within the region of excitation within the photorefractive polymeric material, thereby modulating the refractive index of the material at the focal point to record data.

* * * * *